V. G. APPLE.
BATTERY CARRIER.
APPLICATION FILED DEC. 21, 1908.
971,876.
Patented Oct. 4, 1910.
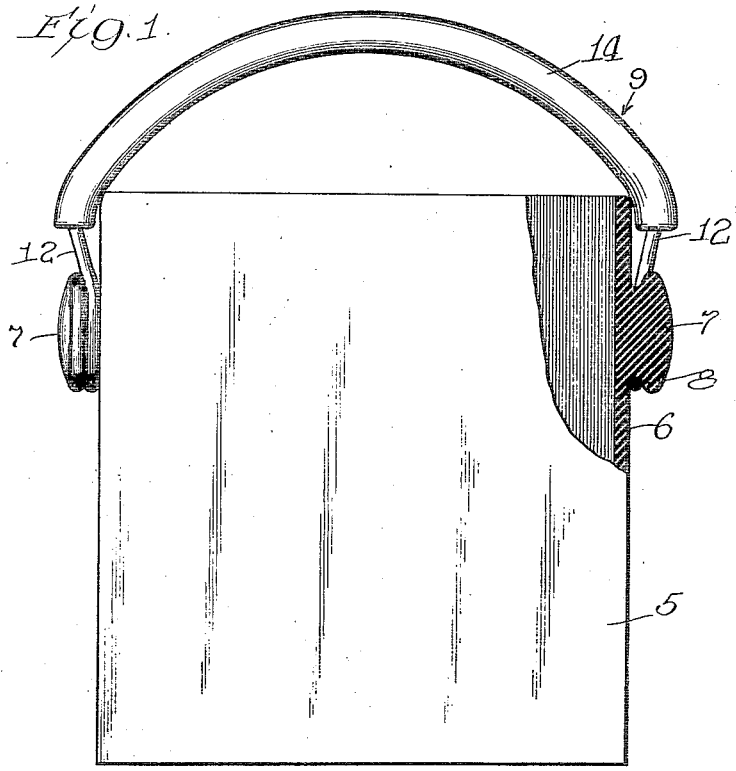
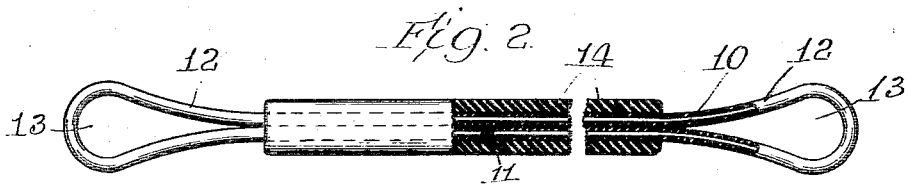
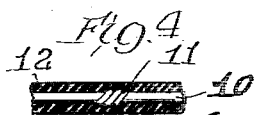

UNITED STATES PATENT OFFICE.

VINCENT G. APPLE, OF DAYTON, OHIO.

BATTERY-CARRIER.

971,876. Specification of Letters Patent. Patented Oct. 4, 1910.

Application filed December 21, 1908. Serial No. 468,518.

*To all whom it may concern:*

Be it known that I, VINCENT G. APPLE, a citizen of the United States, residing at Dayton, in the county of Montgomery and State of Ohio, have invented certain new and useful Improvements in Battery-Carriers, of which the following is a specification.

My invention relates to improvements in battery carriers, and has for its general object to provide improved means for facilitating the handling of storage batteries.

Heretofore it has been customary to provide a storage battery with casings, and carrying handles, generally in the form of a strap attached by screws or other extraneous fastening means to the casing, of wood or the like, enveloping the battery cell, but such constructions have the obvious disadvantages of susceptibility to attack of the acid of the storage battery, presence of metallic parts in proximity to the battery, weakness of the anchorage, if the containing housing is made thin; and others well known to those skilled in the art.

Among the salient objects of my invention are to provide a battery casing or housing affording unitary means for the attachment of a handle, a handle structure of improved construction, and an advantageous combination of battery housing and handle, which may be strong, light, compact, non-conducting, and resistant throughout to the attack of acid.

In the drawing, wherein I have shown an embodiment of my invention; Figure 1 is a side view with parts in section of a battery housing and handle; Fig. 2 is a plan view with parts in section; Fig. 3 is a section therethrough, and; Fig. 4 is an enlarged detail of a fragment of the handle.

In the embodiment of my invention I provide a battery casing or housing, either intimately connected with or enveloping the battery cell or cells, constructed of rubber or analogous composition adequately resistant to the attack of the acids of storage batteries, and preferably of a plastic nature. This containing casing or housing, generally indicated at 5 in the drawing, preferably has its several walls 6 molded as an integral construction, two of its opposing side walls being provided with integral projections 7, preferably in the form of superficially large, relatively shallow, buttons having overhanging heads 8. Such construction affords a housing that may be made relatively thin, and provided with self-supporting integral anchorage structures for the handle, of relatively large size, capable of standing considerable diametrical strain without distortion of the button or its carrying wall, and thus suitable as anchorage points for the carrying handle. The handle structure, generally indicated at 9, as in the form of a suitable transverse hand grasp member, provided with end loops for engaging the headed buttons, and in the preferred embodiment of my invention it consists of a closed, flexible, insulating band, centrally enveloped by a sleeve, constituting a hand grip, so that the ends of the closed band constitute projecting end loops for application to the buttons.

In the construction shown, 10 indicates a cord, cable or the like, of a flexible material such as twine, having its ends joined, as shown at 11 in Fig. 4, so that the cord in its entirety constitutes a closed band. The entire length of the closed band is enveloped in a covering 12 of insulating material which may conveniently be a rubber tube, slipped upon the cord before the ends of the cord are joined, having its meeting ends vulcanized together so that said envelop or sleeve is closed throughout its entire extent. The insulated flexible band thus provided is doubled together and its central portion surrounded by a strengthening sleeve 14, of suitable length, preferably in the form of a rubber tube of considerable thickness, slipped over the flexible band, and of such extent that only end loops 13 of the band are left exposed. The band is vulcanized to the rubber envelop, so that the entirety thus constituted takes the cross sectional form illustrated in Fig. 3. Preferably the length of the central strengthening portion or hand grasp portion, 14, of the handle is such that when in use it extends from edge to edge of the receptacle 5 and receives the edges of said receptacle in contact with its side surfaces.

It will be apparent that the handle structure 9 thus constituted, comprises a cross member for traversing the housing receptacle 5, and end loops connected with said cross member for engaging the buttons on the cell, is, when constructed as above described, strong, light and of uniform texture and appearance with the casing or housing of the cell.

The handle is applied, as shown in Fig.

1, with its end loops gripping the button, and it will be apparent that, while the handle is detachable, the springiness of its relatively heavy mid-portion, arched across the receptacle, will effectually prevent accidental detachment of the handle, while the weight of the battery positively prevents its displacement while the battery is being carried by means of the handle.

It will be apparent however to those skilled in the art that numerous changes in the details from the illustrative construction above disclosed might be made without departure from the spirit of my invention and within the scope of the appended claims.

Having described my invention, what I claim is;

1. The combination of a casing providing integral buttons, each having a head and a narrower neck, and a storage battery handle comprising a closed band of flexible insulating material, and a sleeve enveloping the central portion of said closed band to form an integral central hand grasp and leave the end thereof projecting in the form of closed loops for engagement around the neck and engagement by the head thereof.

2. A storage battery handle comprising an insulating closed band of flexible material, and a rubber tube enveloping the central portion of said closed bands and vulcanized thereto to form an integral hand grasp, and leaving its ends extending in the form of closed loops.

3. A storage battery handle consisting of a non-elastic cord in the form of a closed band, a tubular insulating envelop for said band, and an insulating sleeve surrounding the mid-portion of the said insulated band to leave its ends projecting in the form of closed loops, the said sleeve and the envelop for the core being vulcanized together.

4. The combination of a storage battery casing provided with diametrically opposite buttons each consisting of a head and a relatively narrower neck, and a handle comprising an insulated loop and an insulating tube slipped thereover to leave opposite end loops extending from said tube for engagement over the buttons of the casing.

5. The combination of a storage battery casing provided on its sides somewhat below the upper edge thereof with diametrically opposite buttons, each consisting of a head and a relatively narrower neck, and a handle comprising a closed loop and an insulating tube slipped thereover to leave opposite end loops extending from said tube for engagement over the buttons of the casing, said tube being of a length such that it extends from a point between the button and the upper edge of the casing sides upward, around, and downward to a similar point on the opposite side of the casing.

In testimony whereof I hereunto set my hand in the presence of two witnesses.

VINCENT G. APPLE.

In the presence of—
E. V. MARTIN,
N. E. SNYDER.